Patented Feb. 4, 1941

2,230,574

UNITED STATES PATENT OFFICE

2,230,574

DYESTUFFS OF THE ANTHRAQUINONE SERIES

Walter Mieg, Opladen, and Hans Raab, Leverkusen-Wiesdorf, Germany, assignors to General Aniline & Film Corporation, a corporation of Delaware No Drawing. Application July 14, 1938, Serial No. 219,248. In Germany July 20, 1937

4 Claims. (Cl. 260—367)

This invention relates to new and valuable dyestuffs of the anthraquinone series and to a process of making the same.

These dyestuffs are distinguished by having a methoxy group or groups, this group or these groups being attached to an α-phenylamino substituent of a monoarylamino-dianthraquinonyl amine or to both to the α-phenylamino substituent and to an anthraquinone of the dianthraquinonylamino radical. The dyestuffs also carry in the phenyl nucleus of the phenylamino group a sulfonic acid group or groups. The dyestuffs may also carry substituents such as hydroxyl groups, amino or substituted amino groups, for instance alkylamino or aroylamino groups or nitro groups.

Our new dyestuffs are sulfonic acids or monoarylamino-dianthraquinonyl amines which correspond to the following general formula

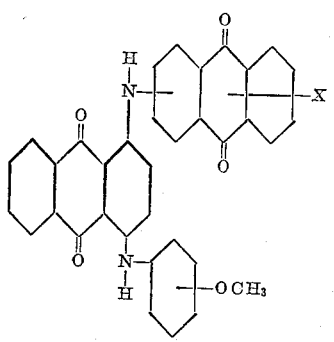

wherein X stands for a member of the group consisting of hydrogen, hydroxyl, the nitro, amino, alkylamino, aroylamino, and methoxy group.

We make the new dyestuffs by sulfonating compounds of the above mentioned general formula. Suitable sulfonation agents are, for instance, concentrated or fuming sulfuric acid. Depending on the nature of the sulfonation agent employed and of the monoarylamino-dianthraquinonyl amine used as starting material the sulfonation process is carried out either at room temperature or at a lower temperature or in the heat. By varying the sulfonation conditions one or several sulfonic acid groups can be introduced. In each case in the dyestuff thus obtained sufficient sulfonic acid groups must be present to give the dyestuff sufficient solubility to be used in dyeing animal fibers. In many cases one sulfonic acid group is sufficient for this purpose.

Our new dyestuffs dye animal fibers gray shades of excellent fastness properties. They are superior to the known sulfonation products of the 4-anilido-1.1'-dianthrimides by their increased equalizing capacity and besides in the most cases by their improved fastness to washing.

In order to further illustrate our invention the following examples are given, but we wish it, however, to be understood that our invention is not limited to the particular products or the reaction conditions stated therein, the parts being by weight:

Example 1

10 parts of the anthrimide obtainable from 1-amino-4-p-anisidino-anthraquinone and 1-chloroanthraquinone are dissolved in 150 parts of oleum containing 3–5% of anhydride and stirred for a short time at 15–20° C. until a test portion is completely soluble in water. Then the mixture is stirred onto ice to which 2 parts of bisulfite lye are added. After standing several hours the mixture is heated to 70–80° C., the separated product filtered and washed with dilute hydrochloric acid until neutral. In the following examples the reaction products are worked up in the same manner.

The sulfonic acid thus obtained dyes wool from an acid bath and after having been subjected to a chroming process even grayish green shades. The dyeings are of good fastness properties to washing and fulling.

Another and similar dyestuff which dyes wool bluish gray shades can be obtained by sulfonating the 4-m-anisidino-1.1'-dianthraquinonylamine in an analogous manner at a temperature of 0–5° C.

Example 2

10 parts of a mixture of 4-o-anisidino-1.1'-dianthraquinonylamine and 4-p-anisidino-1.1'-dianthraquinonylamino (obtainable from 1-aminoanthraquinones and 1-nitro-4-chloroanthraquinone by anthrimide-fusion and subsequently exchanging the nitro group in the 4-nitro-1.1'-dianthraquinonylamine thus obtained by the anisidine residue by heating it with a mixture of equal parts of o- and p-anisidine) are dissolved in 110 parts of sulfuric acid monohydrate at a temperature of 20° C. and thereto are added 38 parts of oleum of 5%. The mixture is stirred for one hour at 20° C. and worked up according to Example 1. The dyestuff thus obtained dyes wool even greenish gray shades of good fastness properties to fulling.

Example 3

4 parts of 4-p-anisidino-4'-hydroxy-1.1'-dianthraquinonylamine (obtainable from 1-p-anisidino-4-aminoanthraquinone and 1-chloro-4-hydroxyanthraquinone by anthramide-fusion) are dissolved in 60 parts of oleum of 20% to which 2 parts of boric acid have previously been added, and the reaction mixture heated to 100° C. for 20 minutes. After working up in the usual manner a dyestuff is obtained which yields on wool gray shades which are greener than those ob-

Example 4

By using instead of the starting material indicated in Example 1 10 parts of the anthrimide from 1-p-anisidino-4-aminoanthraquinone and 1-bromo-4-methoxy-anthraquinone and sulfonating it for half an hour, a dyestuff is obtained yielding on wool even greenish gray shades of good fastness properties to washing and fulling.

Example 5

5 parts of the anthrimide from 1-benzoylamino-4-chloroanthraquinone and 1-amino-4-p-anisidinoanthraquinone are heated in 50 parts of concentrated sulfuric acid for a short time to 80° C. in order to split up the benzoyl group. Then the mixture is cooled and heated to 60° C. for 30 mintues after the addition of 25 parts of oleum of 65%. When working up a dyestuff is obtained yielding on wool even grayish green shades of good fastness properties to washing, fulling and potting.

Example 6

8 parts of 4-p-anisidino-4'-methylamino-1.1'-dianthraquinonylamine (obtainable from 1-methylamino-4-bromoanthraquinone and 1-amino-4-p-anisidinoanthraquinone by anthrimide-fusion) are dissolved in the tenfold quantity of oleum of 30% and stirred for half an hour at 50–60° C. The dyestuff obtained dyes wool grayish green shades.

Example 7

5 parts of the anthrimide obtainable from 1-amino-4-p-anisidinoanthraquinone and 1-chloro-4-nitroanthraquinone are dissolved in 60 parts of oleum of 10% while cooling by means of ice and then stirred at room temperature, until a test portion is completely soluble in water. The dyestuff yields on wool bluish gray shades of good fastness properties to washing.

Example 8

2 parts of the anthrimide obtainable from 1-amino-4-p-anisidinoanthraquinone and 2-chloroanthraquinone are stirred with the 12-fold quantity of oleum containing 2% of anhydride for 1½ hours at a temperature of 0–5° C. When working up in the usual manner a dyestuff is obtained yielding on wool even greenish gray shades.

We claim:

1. Sulfonic acids of compounds carrying the sulfonic acid group on the phenylamino substituent of the general formula

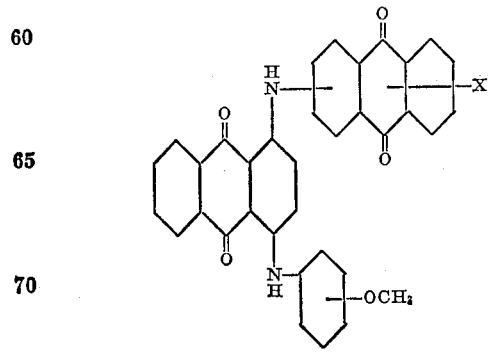

wherein X being a substituent which is in an α-position stands for a member of the group consisting of hydrogen, hydroxyl, the nitro, amino, alkylamino, aroylamino and methoxy group.

2. The compound of the following formula:

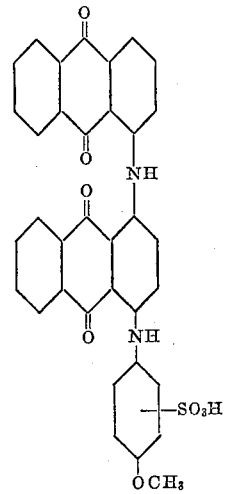

3. The compound of the following formula:

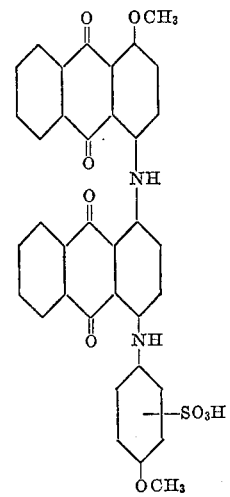

4. The compound of the following formula:

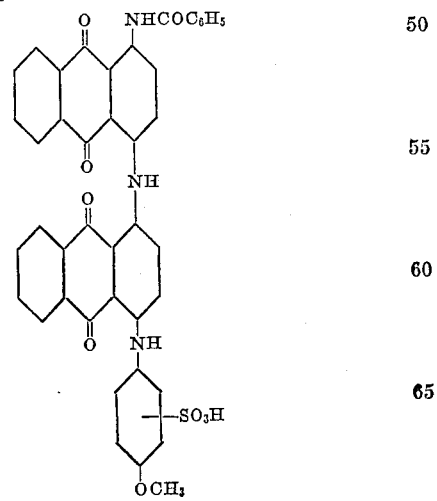

WALTER MIEG.
HANS RAAB.